United States Patent Office 3,441,521
Patented Apr. 29, 1969

3,441,521
ALKENE OXIDE POLYMERIZATION WITH A SUPPORTED COBALT OXIDE-MOLYBDENUM OXIDE CATALYST
Henry L. Hsieh, Bartlesville, Okla., assignor to Phillips Petroleum Company, a corporation of Delaware
No Drawing. Filed June 7, 1965, Ser. No. 462,120
Int. Cl. C08d 1/26, 1/32, 3/00
U.S. Cl. 260—2                 10 Claims

ABSTRACT OF THE DISCLOSURE

Vicinal alkene oxides are polymerized by contacting at least one alkene oxide monomer with a catalyst system comprising a supported cobalt oxide-molybdenum oxide catalyst system. The resulting poylmer products are rubbery polymers. The efficiency of the catalyst system can be further improved by utilizing an organometallic compound in conjunction with the supported cobalt oxide-molybdenum oxide catalyst system.

---

This invention relates to alkene oxide polymerization. In one aspect, this invention relates to catalysts for polymerizing epoxides. In another aspect, this invention relates to processes of polymerizing alkene oxides.

Some of the prior are processes of polymerizing alkene oxides such as ethylene oxide and propylene oxide to form homopolymers involve the use of a catalyst comprising aluminum oxide or aluminum oxide and an organometallic compound. Other processes of the prior art do not use the aluminum oxide but require only an organometallic compound to form the alkene oxide polymer. An inherent shortcoming associated with these processes is in the type of polymer formed. In many cases, the polymer is a low molecular weight liquid which cannot be molded or otherwise formed into useful articles. In other instances, the produced polymer is a brittle solid with no elasticity and very limited utility. Although several attempts have been made to alter or modify the processes of the prior art in an attempt to improve the product, none of these attempts has been successful.

According to this invention, these and other disadvantages of the prior art processes of polymerizing alkene oxides are overcome by providing a novel catalyst system which results in the formation of a rubbery polymer. The novel catalyst of this invention comprises cobalt oxide and molybdenum oxide supported on a suitable carrier material. In another embodiment of the invention, the efficiency of the process is increased by utilizing an organometallic compound in conjunction with the cobalt oxide-molybdenum oxide catalyst. Organometallic compounds which can be used include organoalumnium and organozinc hydrides and halides. Mixtures of two or more alkene oxides can be copolymerized to form rubbery polymers by means of the catalyst system of this invention. When one or more of the alkene oxides is unsaturated, the rubbery polymer is sulfur vulcanizable.

Accordingly, it is an object of this invention to provide an improved process of polymerizing alkene oxides.

Another object of this invention is to provide a novel catalyst for polymerizing alkene oxides.

A further object of this invention is to provide a process of polymerizing alkene oxides which results in the formation of high molecular weight rubbery polymers.

Still another object of this invention is to provide a process of polymerizing alkene oxides wherein the monomer conversion is much higher than the monomer conversion by the processes of the prior art.

A still further object of this invention is to provide a process of polymerizing alkene oxides wherein the inherent viscosity of the polymer is much higher than the inherent viscosity of the polymer produced by the processes of the prior art.

Yet another object of this invention is to provide a process of producing alkene oxide polymers which are flexible at low temperatures, and which are highly resistant to the effects of high temperatures and to the effects of ozone.

These and other objects of the invention will become apparent to one skilled in the art after studying the following detailed description and the appended claims.

Any alkene oxide can be homopolymerized or copolymerized with the novel catalyst of this invention. For example, alkene oxides containing up to and including 20 carbon atoms per molecule can be polymerized by the process of this invention. Generally, it is preferred that the alkene oxide monomer contain from about 2 to about 8 carbon atoms. Alkene oxides which can be polymerized in accordance with this invention can be represented by the formula

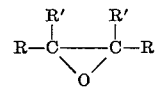

wherein R and R' are selected from the group consisting of hydrogen, saturated aliphatic, saturated cycloaliphatic, monoolefinic aliphatic, diolefinic aliphatic (conjugated and non-conjugated), monoolefinic cycloaliphatic, diolefinic cycloaliphatic (conjugated and non-conjugated), and aromatic radicals and combinations of these such as arakyl, alkaryl, and the like. Some or all of the R and R' radicals can be halogen-substituted, and can contain oxygen in the form of an acyclic ether linkage (—O—) or an oxirane group

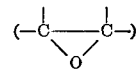

Further, the alkene oxides represented by the above formula can contain 1 or 2 olefinic linkages, 1 or 2 oxirane groups, and up to 1 ether linkage. In addition, both R' variables can represent a divalent aliphatic hydrocarbon radical which, together with the carbon atoms of the oxirane group, can form a cycloaliphatic hydrocarbon nucleus containing from about 4 to about 10 carbon atoms and preferably from about 4 to about 8 carbon atoms.

Specific examples of some of the alkene oxides which are within the above structural formula and which can be homopolymerized or copolymerized in accordance with this invention are ethylene oxide (epoxyethane); 1,2-epoxypropane; 1,2-epoxybutane; 2,3-epoxybutane; 1,2-epoxypentane; 2,3-epoxypentane; 1,2-epoxyhexane; 3,4-epoxyhexane; 1,2-epoxyheptane; 2,3-epoxyoctane; 2,3-dimethyl-2,3-epoxypentane; 1,2-epoxy-4-methylpentane; 2,3-epoxy-5-methylhexane; 1,2-epoxy-4,4-dimethylpentane; 4,5-epoxyeicosane; 1-chloro-2,3-epoxypropane(epichlorohydrin); 1-bromo-2,3-epoxypropane; 1,5-dichloro-2,3-epoxypentane; 2-iodo-3,4-epoxybutane; styrene oxide; 6-oxabicyclo[3.1.0]hexane; 7-oxabicyclo[4.1.0]heptane; 3-propyl-7-oxabicyclo[4.1.0]heptane; bis(2,3-epoxypropyl) ether; tert-butyl 4,5-epoxyhexyl ether; and 2-phenylethyl 3,4-epoxybutyl ether.

Unsaturated alkene oxides within the above structural formula, including ethers, which can be homopolymerized or copolymerized with the saturated alkene oxides include allyl 2,3-epoxypropyl ether (allyl glycidyl ether);
allyl 3,4-epoxybutyl ether;
1-methallyl 3,4-epoxyhexyl ether;
3-hexenyl 5,6-epoxyhexyl ether;
2,6-octadienyl 2,3,7,8-diepoxyoctyl ether;
6-phenyl-3-hexenyl 3-ethyl-5,6-epoxyhexyl ether;
3,4-epoxy-1-butene (butadiene monoxide);
3,4-epoxy-1-pentene; 5-phenyl-3,4-epoxy-1-pentene;
1,2,9,10-diepoxy-5-decene;
6,7-di-n-butyl-3,4,9,10-diepoxy-1,11-dodecadiene;
epoxy vinyl ether;
allyl 2-methyl-2,3-epoxypropyl ether;
3-cyclohexyl-2-propenyl 4-cyclohexyl-3,4-epoxybutyl ether;
2,4-pentadienyl 2,3-diethyl-3,4-epoxybutyl ether;
1-methallyl 6-phenyl-3,4-epoxyhexyl ether;
5-(4-tolyl)2,3-epoxypentyl vinyl ether;
bis[4-(3-cyclopentenyl)2,3-epoxybutyl] ether;
2-(2,4-cyclohexadienyl)ethyl 2,3-epoxybutyl ether;
2-(2,5-cyclohexadienyl)ethyl 2-benzyl-4,5-epoxypentyl ether;
3,4-epoxy-1,5-hexadienyl isopropyl ether;
allyl 3,4-dimethyl-3,4-epoxyhexyl ether;
3,4-epoxy-4-(2,3-dimethylphenyl)1-butene;
3,4-dimethyl-3,4-epoxy-1-pentene;
5-(4-methylcyclohexyl)3,4-epoxy-1-pentene;
4,5-diethyl-4,5-epoxy-2,6-octadiene;
4-(2,4-cyclopentadienyl)1,2,6,7-diepoxyheptane; and
1-phenyl-1,2-epoxy-5,7-octadiene.

In the preferred embodiment of this invention, the novel catalyst system comprises cobalt oxide and molybdenum oxide supported on a suitable carrier material. Carrier materials which can be used for this purpose include alumina, silica, zirconia, thoria, magnesia, magnesium hydroxide, titania, and the like. Combinations and mixtures of the foregoing carriers can also be used, if desired. Since the actual carrier employed can include a variety of different materials, it is obvious that carriers other than those hereinbefore identified can be used if desired.

The cobalt oxide-molybdenum oxide catalyst is well known in the hydrocarbon processing art for dehydrogenating, desulfurizing, hydroforming, and reforming hydrocarbons. The catalyst can be prepared by depositing the oxides of cobalt and molybdenum on the carrier in a variety of different ways. For example, the prior art processes of impregnation and coprecipitation as described in U.S. Patent Nos. 2,486,361 and 2,728,710, can be used for preparing the catalyst. Thus, the carrier in the form of a powder or pellet can be immersed in a solution of molybdenum and cobalt salts such as ammonium molybdate and cobalt nitrate. This technique will cause some of the solution to become absorbed on the carrier. The carrier including the adsorbed salts can then be dried and calcined to convert the salts to the corresponding metal oxides. Since the actual technique of preparing the catalyst is within the scope of one skilled in the art, and since such technique forms no part of this invention, it is obvious that the invention is not intended to be bound by any particular method of catalyst preparation.

When an organometallic compound is employed with the cobalt oxide-molybdenum oxide catalyst, in accordance with another embodiment of the invention, the overall efficiency of the process is improved in the sense that the monomer conversion is increased and the inherent viscosity of the polymer is higher. The organometallic compound which can optionally be employed in the process can be represented by the formula $$R''_n M X_m$$

wherein $R''$ is a hydrocarbon radical selected from the group consisting of saturated aliphatic, saturated cycloaliphatic, and aromatic containing from 1 to 20 carbon atoms, inclusive, and combinations such as aralkyl, alkaryl, and the like; M is a metal selected from the group consisting of aluminum and zinc; X is a member of the class consisting of hydrogen, fluorine, chlorine, bromine, and iodine; $n$ is an integer of from 1 to 3, inclusive; $m$ is an integer of from 0 to 2, inclusive; and the sum of the integers $n$ and $m$ equals the valence of the metal M. Organozinc and organoaluminum compounds within the above formula include diorganozinc compounds, triorganoaluminum compounds, organozinc monohalides, organozinc monohydrides, organoaluminum monohalides, organoaluminum dihalides, organoaluminum sesquihalides, organoaluminum monohydrides, and organoaluminum dihydrides. The organoaluminum sesquihalides as herein defined are intended to mean a mixture of organoaluminum monohalides and organoaluminum dihalides of the formulas $R''_2AlX$ and $R''AlX_2$, respectively, wherein $R''$ is the same as hereinbefore defined with respect to the general formula and X is a halogen. The organoaluminum sesquihalides can then be written as $R''_3Al_2X_3$ or as $R''_{1\,1/2}AlX_{1\,1/2}$. Exemplary organometallic compounds within the above general formula include trimethylaluminum;
triethylaluminum;
tri-n-propylaluminum;
triisobutylaluminum;
tri-n-hexylaluminum;
tri-n-octylaluminum;
tricyclohexylaluminum;
triphenylaluminum;
tri-n-butylaluminum;
tri-n-decylaluminum;
tri-n-eicosyaluminum;
methyldiphenylaluminum;
tribenzylaluminum;
bis(3,5-n-heptylphenyl)methylaluminum;
tri-1-naphthylaluminum;
di-n-octylphenylaluminum;
tri-4-tolylaluminum;
dimethylchloroaluminum;
methyldichloroaluminum;
methylisobutylchloroaluminum;
n-heptyldifluoroaluminum;
diphenylbromoaluminum;
dibenzylchloroaluminum;
di-n-octylchloroaluminum;
n-octylphenylchloroaluminum;
di-n-eicosyliodoaluminum;
n-butyldihydroaluminum;
methyldihydroaluminum;
diisopropylhydroaluminum;
ethylmethylhydroaluminum;
diphenylhydroaluminum;
benzyl-n-dodecylhydroaluminum;
bis(2,4,6-tri-n-butyloctyl)hydroaluminum;
dimethylzinc;
diethylzinc;
di-n-propylzinc;
diisopropylzinc;
di-n-butylzinc;
diisobutylzinc;
di-n-amylzinc;
di-n-hexylzinc;
di-n-octylzinc;
di-n-dodecylzinc;
dicyclopentylzinc;
dicyclohexylzinc;
bis(2,5-dimethylcyclopentyl)zinc;
bis(3,5-dimethylcyclohexyl)zinc;
diphenylzinc;
bis(2-n-hexyltetradecyl)zinc;
bis(4-cyclohexyloctyl)zinc;
bis(2-n-butylcyclohexyl)zinc;
bis(2,4,8-trimethylhendecyl)zinc;
bis(7-n-pentyltetradecyl)zinc;

bis[2-(2,3,5-tri-n-butylphenyl)ethyl]zinc;
dibenzylzinc;
bis(4,6-dicyclopentyldecyl)zinc;
methylethylzinc;
ethylisopropylzinc;
n-propyl-n-hexylzinc;
methylchlorozinc;
ethylbromozinc;
n-propylchlorozinc;
n-amylbromozinc;
n-hexyliodozinc;
n-octylchlorozinc;
cyclopentylchlorozinc;
cyclohexylbromozinc;
2-n-hexyltetradecylchlorozinc;
7-n-pentyltetradecylbromozinc;
benzylbromozinc;
4,6-dicyclopentyldecylbromozinc;
n-dodecylfluorozinc;
3,5-methylcyclohexylchlorozinc;
cyclohexyliodozinc;
methylhydrozinc;
cyclohexylhydrozinc;
n-eicosylhydrozinc;
4-tolylhydrozinc; and
n-amylhydrozinc.

The mole ratio of the cobalt oxide to the molybdenum oxide in the catalyst is preferably within the range of from about 0.1:1 to about 7:1 with the preferred range being about 0.2:1 to about 5:1. The cobalt oxide-molybdenum oxide catalyst including the carrier material contains from about 0.5 to 15 percent by weight cobalt oxide and from about 2 to about 20 percent by weight molybdenum oxide. Thus, the combined weight of cobalt oxide and molybdenum oxide in the cobalt oxide-molybdenum oxide catalyst is within the range of from about 2.5 to about 35 percent by weight.

Although the amount of cobalt oxide molybdenum oxide catalyst used for effecting polymerization of the alkene oxides can be varied over a rather broad range, it is preferred that the catalyst be present within the range of from about 0.5 to about 30 parts by weight per 100 parts by weight monomer and preferably within the range of from about 1 to about 20 parts by weight per 100 parts by weight monomer. Thus, the total amount of cobalt oxide, molybdenum oxide and carrier material present is within the range of from about 0.5 to about 30 parts by weight per 100 parts by weight monomer and preferably within the range of from about 1 to about 20 parts by weight per 100 parts by weight monomer. When an organometallic compound is employed to improve the efficiency of the process in accordance with another embodiment of the invention, it is preferably present in an amount within the range of from about 1 to about 100 grams millimoles of organometal per 100 grams of monomer and preferably in the range of from about 5 to about 50 grams millimoles of organometal per 100 grams monomer.

The alkene oxide polymerization reaction of this invention can be carried out either as a batch process or as a continuous process with the novel catalyst system being added in a single initial charge or in predetermined increments during polymerization. Similarly, the monomers may be introduced into the reaction zone in one charge or they may be added gradually during polymerization. In order to expedite and improve the efficiency of the polymerization reaction, it is generally preferred that the reaction be carried out in the presence of an inert diluent. Suitable diluents which can be used for this purpose include paraffinic, cycloparaffinic, and aromatic hydrocarbons containing from about 4 to about 10 carbon atoms per molecule. Exemplary diluents which can be used are butane, pentane, hexane, decane, cyclopentane, cyclohexane, methylcyclohexane, benzene, toluene, xylene, ethylbenzene, and the like. It is also within the spirit and scope of this invention to employ halogenated hydrocarbons such as chlorobenzene and the like as diluents. Since the actual diluent employed is largely a matter of choice, it is obviously possible to employ other diluents and those herein identified without departing from the spirit and scope of the invention. Mixtures of suitable compounds can also be employed as diluents.

The temperature and pressure at which the polymerization process of this invention is effected can vary over a rather wide range. Generally, the polymerization is conducted at a temperature within the range of from about 40 to about 250° F. and preferably withi nthe range of from about 85 to about 200° F. Polymerization is usually conducted at a pressure which will maintain the materials in the liquid state. It is obvious that reaction ca nbe conducted at superatmospheric pressures o fseveral thousand pounds, if desired.

The duration of the polymerization reaction will depend primarily upon temperature, pressure, and the activity of the catalyst. The process can be canducted for a period of from less than a minute to about 100 hours or more, A preferred range is from about 10 minutes to about 50 hours.

The rubbery alkene oxide polymers produced in accordance with the novel catalyst system of this invention exhibit extremely good low temperature flexibility. The polymers are particularly resistant to the effects of heat and to the effects of ozone. The polymers produced in the practice of this invention have unlimited utility in the automobile industry for fabricating articles such as motor mounts, body mounts, suspension system parts, hoses, tubing, and the like.

The following examples will serve to illustrate the improved results obtained by polymerizing alkene oxides with the novel catalyst system of this invention. It is to be understood that such examples are for the purpose of illustration only, and that many variations and modifications can be made from the various examples by one skilled in the art without departing from the concept of the invention.

EXAMPLES I-IV

A series of runs were conducted whereby propylene oxide was polymerized by means of the catalyst of this invention. Example I illustrates the operability of the cobalt oxide-molybdenum oxide catalyst. Examples II, III and IV illustrate the operability of the cobalt oxide-molybdenum oxide catalyst in conjunction with different organometallic compounds. The materials were charged to a reactor in the following proportions:

| | |
|---|---|
| Propylene oxide, parts by weight | 100 |
| Toluene, parts by weight | 430 |
| Cobalt oxide-molybdenum oxide on alumina,[1] phm.[2] | 10 |
| Organometallic compounds, mhm.[3] | 30 |
| Temperature, ° F. | 158 |
| Time, hours | 48 |

[1] Analysis showed 3.4 wt. percent CoO and 11.0 wt. percent MoO₃. The remainder was Al₂O₃ in the form of 1/16 inch extrudate. The catalyst was dried at 500° C. for 2 hours.
[2] Phm.=parts by weight per 100 weight parts monomer
[3] Mhm.=gram millimoles per 100 grams monomer The actual polymerization technique employed involved the steps of charging the reactor with toluene and thereafter purging it with nitrogen. The cobalt oxide-molybdenum oxide on alumina was then added to the reactor followed by propylene oxide. When the organometallic compound was used, it was added after the propylene oxide. After allowing the reaction to continue for a period of 48 hours at a temperature of about 158° F., approximately 1 weight percent, based on the polymer, of 2,2'-methylene - bis(4 - methyl - 6 - tert-butylphenol) antioxidant was added. The reaction mixture was then poured into water which had been acidified with hydrochloric acid whereupon an organic phase and an aqueous phase formed. The aqueous phase was removed and the polymer recovered from the organic phase by evaporating the diluent. The recovered polymer was then dried under vacuum. The results of the several runs and the properties of the polymers produced are illustrated in Table I below

TABLE I

| Example No. | Catalyst | Monomer conversion (percent) | Inherent viscosity |
|---|---|---|---|
| 1 | Cobalt oxide-molybdenum oxide on alumina. | 25 | 1.63 |
| 2 | Cobalt oxide-molybdenum oxide on alumina plus triisobutylaluminum. | 45 | 1.81 |
| 3 | Cobalt oxide-molybdenum oxide on alumina plus diethylaluminum chloride. | 42 | 1.74 |
| 4 | Cobalt oxide-molybdenum oxide on alumina plus dibutylzinc. | 35 | 2.06 |

In order to determine the inherent viscosity, one-tenth gram of polymer was placed in a wire cage made from 80-mesh screen and the cage placed in 100 ml. of toluene contained in a wide-mouth, 4-ounce bottle. After standing at room temperature (approximately 77° F.) for about 24 hours, the cage was removed and the solution filtered through a sulfur absorption tube of grade C porosity to remove any solid particles present. The resulting solution was run through a Medalia type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

Several additional runs were conducted using the catalysts of the prior art for polymerizing alkene oxides in order to illustrate the improved results obtained by the catalysts of this invention. These runs were conducted using the same procedures and proportions for the materials as was used in Examples I–IV except that activated alumina was substituted for the cobalt oxide-molybdenum oxide catalyst in four of the runs. In three of the runs, an organometallic compound was employed in conjunction with the activated alumina. In another run, triisobutylaluminum was used alone to illustrate the results obtained when an organometallic compound is employed as a catalyst for polymerizing alkene oxides. The results of the several runs conducted are reported in Table II below.

TABLE II

| Run No. | Catalyst | Monomer conversion (percent) | Inherent viscosity |
|---|---|---|---|
| 1 | Activated alumina | 0 | |
| 2 | Activated alumina plus triisobutylaluminum. | 36 | 0.56 |
| 3 | Activated alumina plus diethylaluminum chloride. | 24 | 0.68 |
| 4 | Activated alumina plus dibutylzinc. | 20 | 1.89 |
| 5 | Triisobutylaluminum [1] | | |

[1] The resulting polymer using this catalyst was liquid.

The inherent viscosity and monomer conversion for Runs 1–5 were determined by the same technique as that used in Examples I–IV.

It can be seen from the data in Table I and Table II that the catalyst of this invention produces a much higher percent monomer conversion in the polymerization of alkene oxides than the corresponding runs made with the catalysts of the prior art. Further, the inherent viscosity of the polymers obtained by the process of this invention is generally much higher than the inherent viscosity of the polymers produced in the corresponding runs with the catalysts of the prior art. The polymers produced by Examples I–IV were rubbery whereas the polymers produced by Runs 1–3 and 5 were liquid. Although the polymer produced by Run No. 4 was a solid, the conversion was much lower than in runs using cobalt oxide-molybdenum oxide on alumina plus an organometallic compound.

As hereinbefore indicated, any unsaturated alkene oxide can be homopolymerized or copolymerized to form a rubbery polymer which can be sulfur vulcanized. In the copolymerization of 1,2-epoxypropane and an unsaturated alkine oxide, it is preferred to employ allyl-2,3-epoxypropyl ether (allyl glycidyl ether) as the unsaturated monomer. In the copolymerization of two unsaturated alkene oxides, it is generally preferred to form a copolymer of allyl-2,3-expoxypropyl ether (allyl glycidyl ether) and 3,4-epoxy-1-butene (butadiene monoxide). These copolymers can be sulfur vulcanized with ease because the polymer chains contain a multiplicity of olefinic bonds. Polymerization conditions and techniques for copolymerizing two or more alkene oxides are the same as in the homopolymerization of alkene oxides. Thus, factors such as catalyst level, temperature, pressure, and the like, in the homopolymerization reaction can be employed in a like manner in the copolymerization reaction.

Although the invention has been described in considerable detail, it must be understood that such detail is for the purpose of illustration only and that many variations and modifications can be made by one skilled in the art without departing from the spirit and scope of the invention.

I claim:

1. A process of polymerizing at least one alkene oxide of the formula

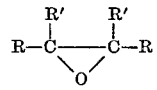

wherein R and R' are selected from the group consisting of hydrogen, saturated aliphatic, saturated cycloaliphatic, monoolefinic aliphatic, diolefinic aliphatic, monoolefinic cycloaliphatic, diolefinic cycloaliphatic, and aromatic radicals, halogen-substituted radicals of the foregoing type, and combinations thereof, and said radicals can contain oxygen in the form of an acylic ether linkage (—O—) or an oxirane group

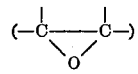

and said alkene oxide can contain 1 or 2 olefinic linkages, 1 or 2 oxirane groups, and 1 ether linkage, and both R' variables in said alkene oxide can represent a divalent aliphatic hydrocarbon radical which together with the oxirane group in said alkene oxide can form a cycloaliphatic nucleus, said process comprising contacting said alkene oxide with a catalyst comprising cobalt oxide and molybdenum oxide supported on a carrier material.

2. The process of claim 1 for producing a polymer of an epoxide compound which comprises polymerizing said alkene oxide at a temperature within the range of from about 40 to about 250° F.

3. A process according to claim 1 wherein the mole ratio of said cobalt oxide to said molybdenum oxide is within the range of from about 0.1:1 to about 7:1, and wherein said catalyst is present in an amount of from about 0.5 to about 30 parts by weight per 100 parts by weight alkene oxide.

4. A process of polymerizing at least one alkene oxide of the formula

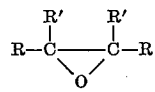

wherein R and R' are selected from the group consisting of hydrogen, saturated aliphatic, saturated cycloaliphatic, monoolefinic aliphatic, diolefinic aliphatic, monoolefinic cycloaliphatic, diolefinic cycloaliphatic, and aromatic radicals, halogen-substituted radicals of the foregoing type, and combinations thereof, and said radicals can contain oxygen in the form of an acyclic ether linkage (—O—) or an oxirane group

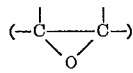

and said alkene oxide can contain 1 or 2 olefinic linkages, 1 or 2 oxirane groups, and 1 ether linkage, and both R' variables in said alkene oxide can represent a divalent aliphatic hydrocarbon radical which together with the oxirane group in said alkene oxide can form a cycloaliphatic nucleus, said process comprising contacting said alkene oxide with a catalyst comprising:
 (a) cobalt oxide and molybdenum oxide supported on a carrier material; and
 (b) an organometallic compound of the formula $R''_nMX_m$ wherein $R''$ is a hydrocarbon radical selected from the group consisting of saturated aliphatic, saturated cycloaliphatic, and aromatic containing from 1 to 20 carbon atoms, inclusive; M is a metal selected from the group consisting of aluminum and zinc; X is a member of the class consisting of hydrogen, fluorine, chlorine, bromine, and iodine; $n$ is an integer of from 1 to 3, inclusive; $m$ is an integer of from 0 to 2, inclusive; and the sum of the integers $n$ and $m$ equals the valence of the metal M.

5. A process according to claim 4 wherein the mole ratio of said cobalt oxide to said molybdenum oxide is within the range of from about 0.1:1 to about 7:1; wherein the total amount of cobalt oxide, molybdenum oxide, and carrier material present is within the range of from about 0.5 to about 30 parts by weight per 100 parts by weight alkene oxide; and wherein said organometallic compound is present in an amount of from about 1 to about 100 gram millimoles per 100 grams of alkene oxide.

6. A process according to claim 4 wherein said alkene oxide is propylene oxide; and wherein said organometallic compound is triisobutylaluminum.

7. A process according to claim 4 wherein said alkene oxide is propylene oxide; and wherein said organometallic compound is diethylaluminum chloride.

8. A process according to claim 4 wherein said alkene oxide is propylene oxide; and wherein said organometallic compound is dibutylzinic.

9. A catalyst system consisting essentially of
 (a) cobalt oxide and molybdenum oxide supported on a carrier material; and
 (b) an organometallic compound of the formula $R''_nMX_m$ wherein $R''$ is a hydrocarbon radical selected from the group consisting of saturated aliphatic, saturated cycloaliphatic, and aromatic containing from 1 to 20 carbon atoms, inclusive; M is a metal selected from the group consisting of aluminum and zinc; X is a member of the class consisting of hydrogen, fluorine, chlorine, bromine, and iodine; $n$ is an integer of from 1 to 3, inclusive; $m$ is an integer of from 0 to 2, inclusive; and the sum of the integers $n$ and $m$ equals the valence of the metal M.

10. A catalyst system according to claim 9 wherein the mole ratio of the cobalt oxide to the molybdenum oxide is within the range of about 0.1:1 to about 7:1; and wherein the organometallic compound is present in an amount within the range of about 1 to about 100 gram millimoles per 100 grams of monomer when the catalyst is used in a polymerization process.

References Cited

UNITED STATES PATENTS

| | | | |
|---|---|---|---|
| 2,912,419 | 11/1959 | Peters et al. | 252—430 |
| 2,915,478 | 12/1959 | Erickson | 252—470 |

OTHER REFERENCES

Journal of Polymer Science, vol. 47, issue 149 (1960) (pp. 486–488).

WILLIAM H. SHORT, *Primary Examiner.*

T. PERTILLA, *Assistant Examiner.*

U.S. Cl. X.R.

252—431, 470; 260—47, 88.3